(12) United States Patent
Akkurt et al.

(10) Patent No.: US 6,987,385 B2
(45) Date of Patent: Jan. 17, 2006

(54) SYSTEM AND METHODS FOR ANALYZING CARBONATE FORMATIONS WHILE DRILLING

(75) Inventors: Ridvan Akkurt, Kingwood, TX (US); Manfred G. Prammer, Downington, PA (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 10/859,496

(22) Filed: Jun. 1, 2004

(65) Prior Publication Data
US 2005/0040819 A1 Feb. 24, 2005

Related U.S. Application Data

(60) Provisional application No. 60/474,747, filed on May 30, 2003.

(51) Int. Cl.
*G01V 3/00* (2006.01)
(52) U.S. Cl. ....................................... 324/303
(58) Field of Classification Search ............... 324/303; 702/8, 13; 73/152
See application file for complete search history.

(56) References Cited

U.S. PATENT DOCUMENTS

| 5,280,243 A | 1/1994 | Miller .................. 324/303 |
| 5,557,201 A | 9/1996 | Kleinberg et al. .......... 324/303 |
| 5,869,755 A * | 2/1999 | Ramamoorthy et al. .. 73/152.05 |
| 5,936,405 A | 8/1999 | Prammer et al. ........... 324/303 |
| 6,040,696 A * | 3/2000 | Ramakrishnan et al. .... 324/303 |
| 6,051,973 A | 4/2000 | Prammer ................. 324/303 |
| 6,088,656 A * | 7/2000 | Ramakrishnan et al. ...... 702/13 |
| 6,115,671 A * | 9/2000 | Fordham et al. ............... 702/8 |
| 6,242,912 B1 | 6/2001 | Prammer et al. ........... 324/303 |
| 6,242,913 B1 | 6/2001 | Prammer ................. 324/303 |
| 6,366,087 B1 * | 4/2002 | Coates et al. .............. 324/303 |
| 6,512,371 B2 | 1/2003 | Prammer ................. 324/303 |
| 6,531,868 B2 * | 3/2003 | Prammer ................. 324/303 |
| 6,573,715 B2 * | 6/2003 | King et al. ................. 324/303 |
| 6,859,034 B2 | 2/2005 | Chen et al. ................. 324/303 |
| 2003/0016012 A1 * | 1/2003 | Coates et al. .............. 324/303 |
| 2003/0231017 A1 * | 12/2003 | Kiesl et al. ................. 324/303 |

* cited by examiner

Primary Examiner—Louis Arana
Assistant Examiner—Dixomara Vargas
(74) Attorney, Agent, or Firm—Jones Day

(57) ABSTRACT

A logging while drilling (LWD) and measuring while drilling (MWD) method is disclosed for analyzing the porosity of geologic formations containing carbonate-formations. The method is based on a combination of T1 and T2 measurements that enables detection of diffusivity coupling and permits more accurate determination of pore size distribution, formation permeability and irreducible water saturation.

13 Claims, 6 Drawing Sheets

SYSTEM AND METHODS FOR ANALYZING CARBONATE FORMATIONS WHILE DRILLING

Priority of Application No. 60/474,747 filed on May 30, 2003 is claimed under 35 U.S.C. § 119.

FIELD OF THE INVENTION

This invention is directed to a logging-while-drilling (LWD) and measurement-while-drilling (MWD) approach for obtaining nuclear magnetic resonance (NMR) data concerning petrophysical properties of a formation. More specifically, the invention is directed to a method and device for detecting different pore systems in carbonate formations and determining the existence of diffusive coupling among different pore systems.

BACKGROUND OF THE INVENTION

LWD and MWD systems are generally known in the art to make downhole measurements while a borehole is being drilled. Such systems measure various parameters and characteristics of the formation, such as its resistivity and the natural gamma ray emissions from the formation. Typically, signals which are representative of these measurements made downhole are relayed to the surface with a mud pulse telemetry device that controls the mud flow, encoding information in pressure pulses inside the drill string. The pulses travel upward through the mud to the surface, where they are detected and decoded so that the downhole measurements are available for observation and interpretation at the surface substantially in real time. In addition, it has also been found useful to provide a downhole computer with sufficient memory for temporarily storing these measurements until such time that the drill string is removed from the borehole.

NMR measurements are based on the observation that when an assembly of magnetic moments, such as those of hydrogen nuclei, are exposed to a static magnetic field, they tend to align along the direction of the magnetic field, resulting in bulk magnetization. The rate at which equilibrium is established in such bulk magnetization upon provision of a static magnetic field is characterized by the parameter $T_1$, known as the spin-lattice relaxation time. The spin-lattice relaxation time $T_1$ describes the coupling of nuclear spins to energy-absorbing molecular motions like rotation, vibration and translation.

Another related and frequently used NMR parameter is the spin-spin relaxation time constant $T_2$ (also known as transverse relaxation time), which is an expression of the relaxation due to non-homogeneities in the local magnetic field over the sensing volume of the logging tool. The mechanisms for spin-spin relaxation time $T_2$ include, in addition to those contributing to $T_1$, the exchange of energy between spins.

The pioneers in NMR measurement technologies envisioned the relaxation time T1 as the primary measurement result because T1 carries only information about the liquid-solid surface relaxation and bulk-fluid relaxation. Unlike T2, T1 is neither affected by rock-internal magnetic field gradients nor by differences in fluid diffusivity. Moreover, instrument artifacts influence T1 measurements to a much lesser degree than T2 measurements.

Despite the theoretical understanding of the superiority of T1 measurements, the oil industry entered the era of modern pulsed NMR logging in the early 1990s with logging tools designed to measure T2. The reasons for the switch from T1 to T2 were mostly stemmed from hardware limitations at that time. Specifically, the construction of the T1 recovery curve requires data collected with multiple wait times that range from a few milliseconds to several seconds. Acquiring T1 data using tools that operated in single-frequency mode without effective pre-polarization was too time-consuming and not feasible. T2 measurements, on the other hand, were faster and contained information similar to T1 at low resonance frequencies. As a result, T2 CPMG measurements were chosen as the main mode of tool operation.

Current developments of LWD and MWD technologies have overcome the hardware limitations and made efficient T1 measurements a reality. In particular, U.S. Pat. Nos. 6,531,868, 6,242,913 and 6,051,973, all to Prammer, disclose LWD and MWD methods and devices for obtaining T1 measurement data concerning petrophysical properties of formations. The contents of these patents are incorporated herein in their entirety by reference. The devices described in these patents contain two distinct operating modes, one designed for while-drilling operations and the other for wiping trips. Typically, the devices engage the motion-tolerant T1 mode when drilling motion is detected and switches over to T2 mode once drilling ceases. It is also very easy to acquire both T1 and T2 data over the same depth interval with an occasional wiping trip. This makes it possible to compare T1 and T2 data to improve the analysis of petrophysical properties. Prammer et al. in "A new direction in Wireline and LWD NMR", presented at the 43$^{rd}$ Annual Logging Symposium Transactions: Society of Professional Well Log Analysis, 2002, presented several LWD and MWD applications where T1 and T2 data were gathered and compared. Contents of the Prammer et al. paper are incorporated herein by reference. It demonstrated that T1 measurements yields equivalent, and in some cased superior, formation evaluation answers. The contents of this article is also incorporated herein in its entirety by reference.

As demonstrated in Prammer et al. the relative insensitivity of T1 measurement with respect to field strength and field gradients gives it a clear advantage over T2 measurement in analyzing carbonate formations containing both micro and macro porosity systems. Current tools employing NMR T2 logging may not be able to distinguish the micropores from the macro-pores in the diffusivity analysis of such formations due to a phenomenon called "Diffusive Coupling". The main cause of diffusive coupling is the weak surface relaxation of carbonates. Weak surface relaxation causes longer T2 times, a well-known NMR property of carbonate rocks. Given weak relaxation, a proton "lives longer". Hence, if a proton originates in a small pore and stays alive for a long time, it may diffuse through the pore system, enter a larger pore, and eventually "die" in the larger pore. The signal from such a proton therefore does not reflect the size of the pore where it originates. Obviously, the reverse can also happen: a proton initially residing in a large pore may eventually "die" in a small one.

The overall effect of diffusive coupling is a blurred T2 distribution. Instead of a bi-modal T2 distribution, where the shorter T2 times are associated with the micro pores, and the longer T2 times with the larger pores, one generally observes a single large broad peak that sweeps mostly mid T2 ranges. Since the pore size information is lost, estimation of Swirr (irreducible water saturation) becomes problematic. This problem also affects the quality of the permeability estimates.

Current technologies attempt to overcome this problem in two ways. The first approach is to study the problem in the lab and trying to estimate the proper T2 "cutoffs" using laboratory NMR, then apply it to T2 logs. The second approach is to make certain assumptions in the pore system and try to deal with the problem through signal processing. (See Ramakrishnan et al. "Forward Models for Nuclear Magnetic Resonance in Carbonate Rocks", paper SS, in 39th Annual Logging Symposium Transactions: Society of Professional Well Log Analysts, 2002, for a detailed description on current technologies for detecting diffusive coupling. The contents of the Ramakrishan et al. paper is incorporated herein in its entirety by reference.) Both approaches, unfortunately, requires making assumptions on the T2 measurement data and are generally not robust. Although the overall effects of diffusive coupling has been less pronounced because diffusive coupling is less of a problem in partially saturated rocks, the problem of NMR T2 logging in detecting diffusive coupling has become a factor that leads to the perception that NMR does not work in analyzing carbonate formations.

Accordingly, it is perceived that there is a need for a LWD and MWD-based system and method to detect diffusive coupling and distinguish different pore systems in the diffusivity analysis of carbonate formations.

SUMMARY OF THE INVENTION

The present invention includes methods for analyzing the porosity of geologic formations containing carbonate-formations during a drilling operation, comprising the steps of: obtaining a first set of NMR measurements using T1 logging; obtaining a second set of NMR measurements using T2 logging; and processing said first and second sets of NMR measurements to derive a porosity interpretation of the carbonate-formation. In one embodiment, the step of processing further comprises computing a distribution of T1 relaxation times and distinguishing different pore systems in the carbonate-formation based on the distribution of T1 relaxation times. In another embodiment, the step of processing further comprises computing a distribution of T2 relaxation times and comparing the distributions of T1 and T2 relaxation times to determine the existence of diffusivity coupling.

The present invention further includes a system for analyzing the porosity of geologic formations containing carbonate-formations during a drilling operation, comprising: means for obtaining a first set of NMR measurements using T1 logging; means for obtaining a second set of NMR measurements using T2 logging; and means for processing said first and second sets of NMR measurements to derive a porosity interpretation of the carbonate-formation. In one embodiment, the system further comprises a drill bit for drilling a borehole in said geologic formation, and at least the means for obtaining the first and second sets of NMR measurement are capable of operating concurrently with the drilling of a borehole.

Additional aspect of the invention are described in further detail below.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

DETAILED DESCRIPTION

Figure 1A:
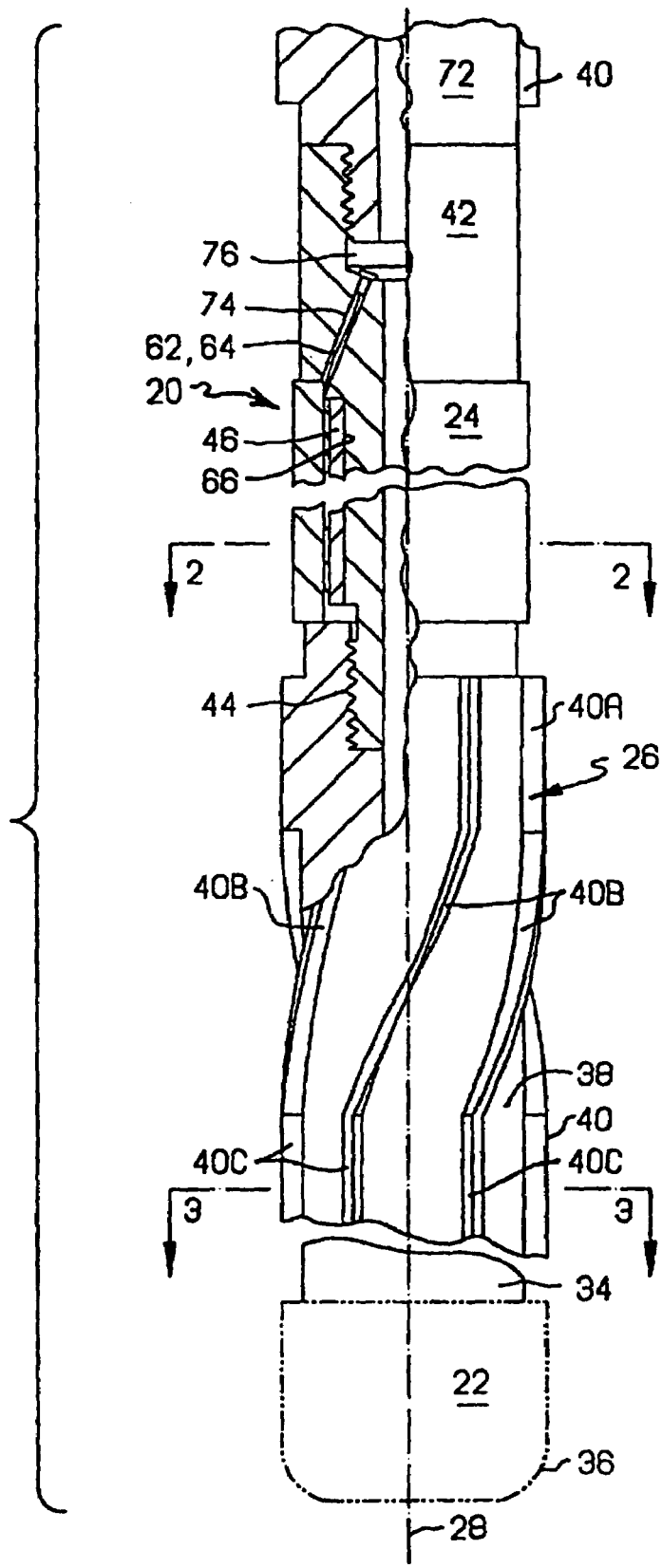
FIG. 1A shows a side elevational view, partly in section, of the lower end of the apparatus disclosed in U.S. Pat. No. 5,280,243.
Figure 1B:
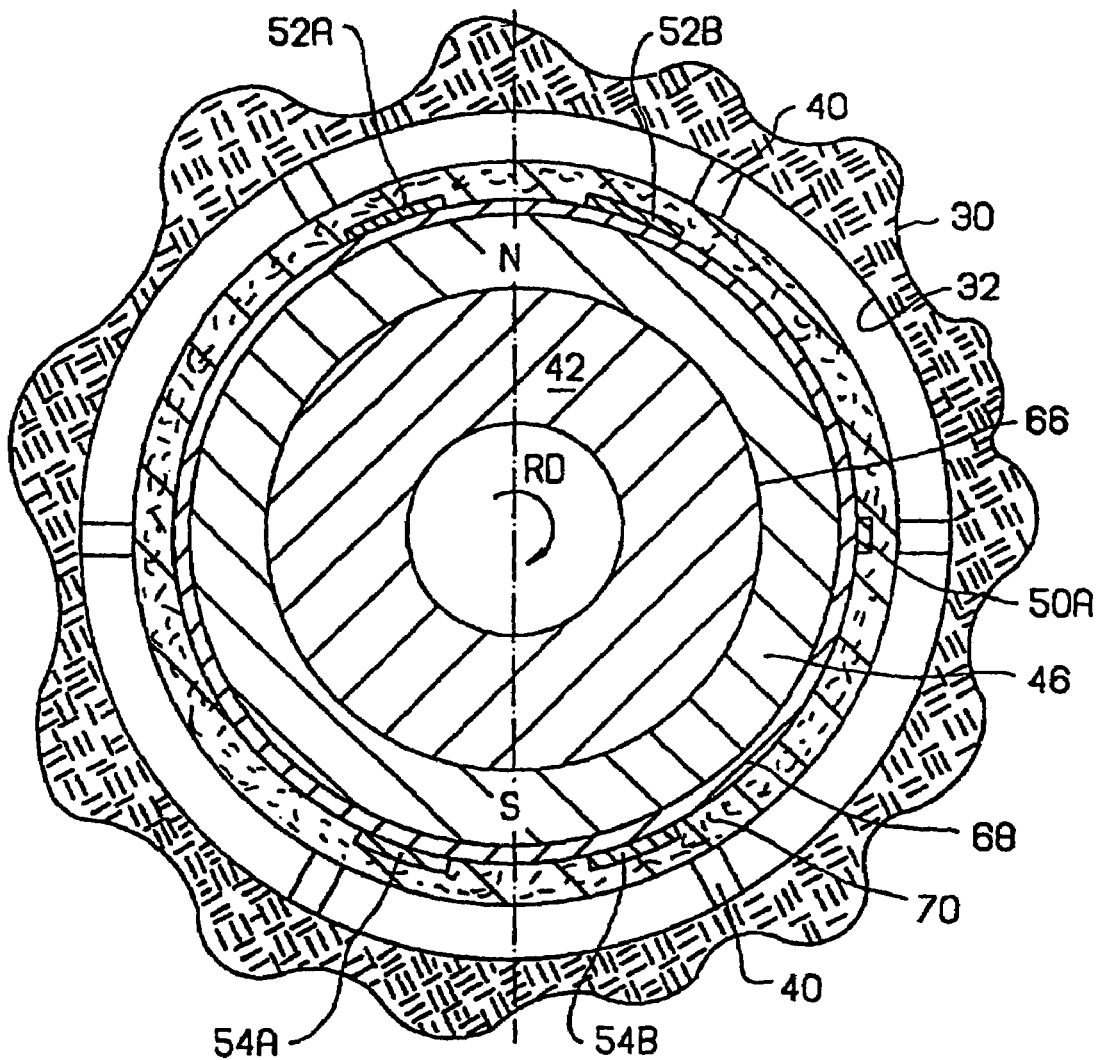
FIG. 1B is an enlarged sectional view taken along the line 2—2 in FIG. 1A.
Figure 2A:
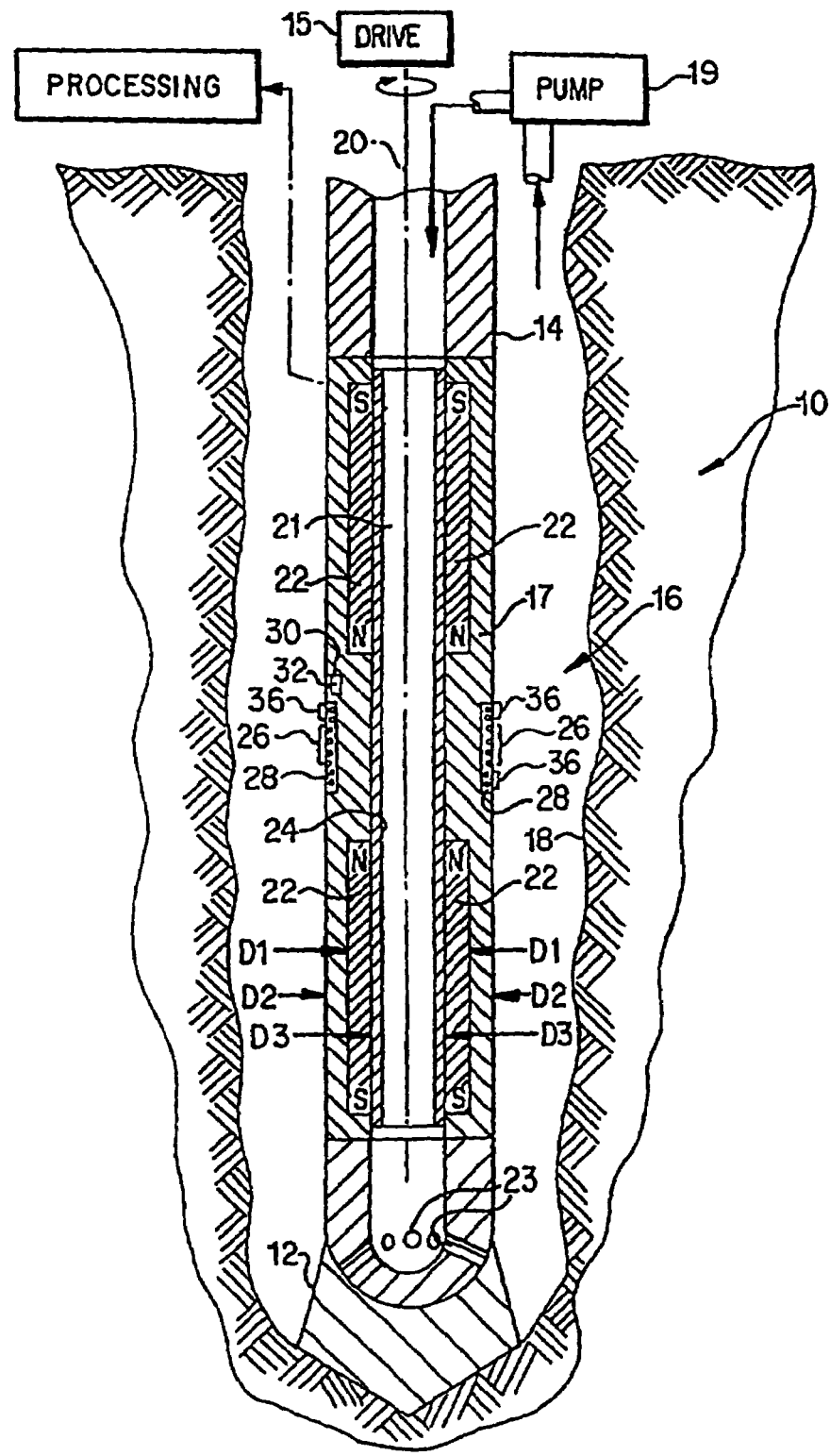
FIG. 2A shows a cross-section of a tool for pulsed NMR formation evaluation disclosed in U.S. Pat. No. 5,557,201.
Figure 2B:
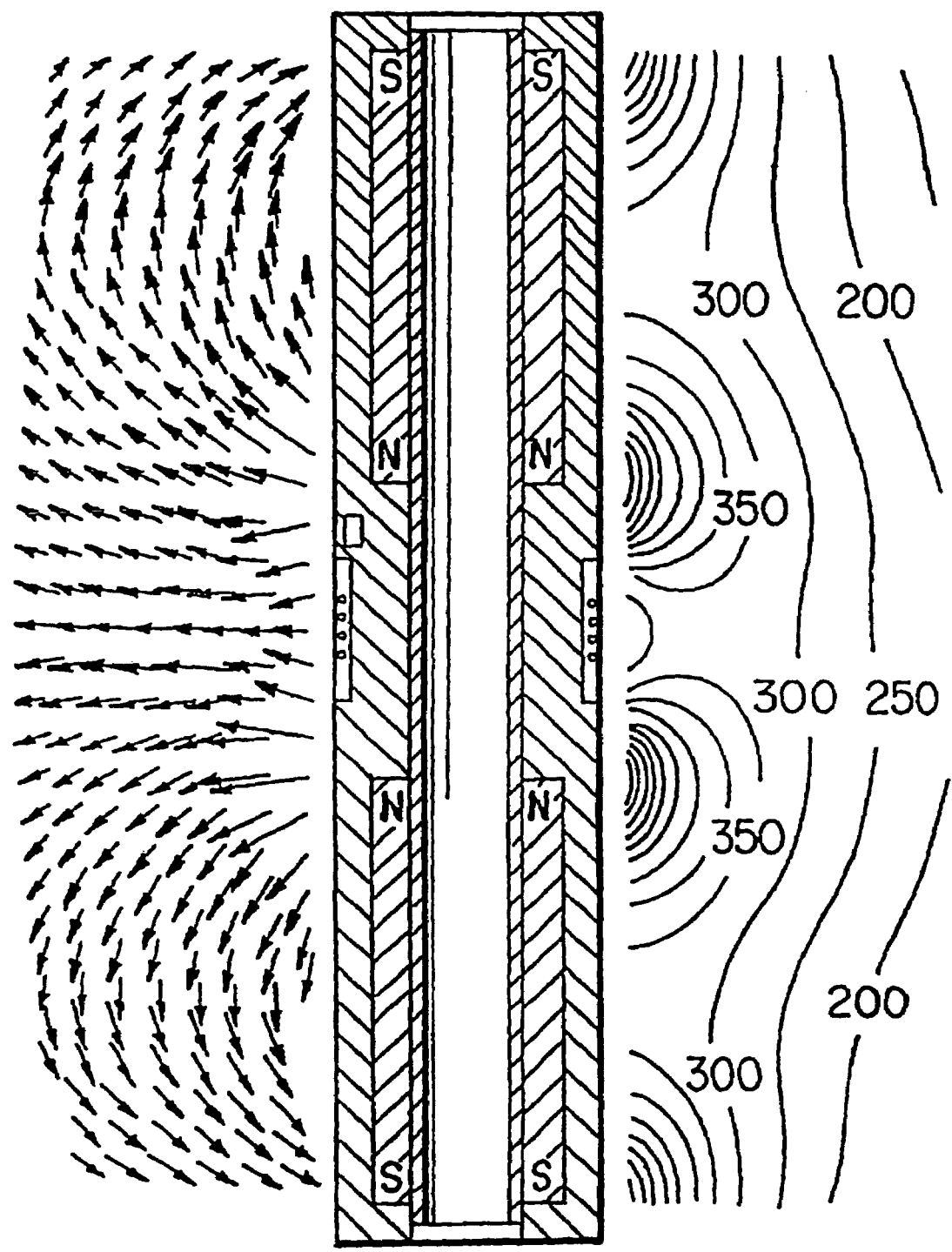
FIG. 2B shows a static field in a vertical plane of the same tool.

The description of the preferred embodiment of the method of the present invention is made with reference to the tool disclosed in U.S. Pat. No. 5,280,243 to Miller, owned by the assignee of the present application. The content of the Miller patent is expressly incorporated herein for all purposes. FIGS. 1A and 1B respectively show a side elevational view, partly in section, of the lower end of the Miller tool and an enlarged sectional view taken along the line 2—2 in FIG. 1A. It should be noted, however, that the method of the present invention can also be used with any tool that generates a rotationally symmetric magnetic field including, for example, the tool disclosed in U.S. Pat. No. 5,557,201 to Kleinberg, illustrated in FIGS. 2A and 2B.

The method of the present invention is based on NMR relaxation time measurements determining longitudinal relaxation times T1 and transversal relaxation times T2. LWD and MWD methods and devices for obtaining T1 measurement data have been disclosed in U.S. Pat. Nos. 6,531,868, 6,242,913 and 6,051,973, all to Prammer, owned by the assignee of the present invention. T2 measurements has been the standard measurements and thus T2 measurement data can be obtained using any current NMR logging tools including, but not limited to, the NMR logging tool disclosed in U.S. Pat. Nos. 6,531,868, 6,242,913 and 6,051,973 and the CMR tools disclosed in [2].

In one embodiment, the method of the present invention includes a method for analyzing the porosity of geologic formations containing carbonate-formations during a drilling operation, comprising the steps of: obtaining a first set of NMR measurements using T1 logging; obtaining a second set of NMR measurements using T2 logging; and processing said first and second sets of NMR measurements to derive a porosity interpretation of the carbonate-formation. The T1 and T2 measurements can be obtained either simultaneously or separately, using the same or different NMR logging tools. In one embodiment, the T1 and T2 measurements are obtained using the LWD-MWD tool disclosed in U.S. Pat. No. 6,531,868 to Prammer. Such a tool contains two distinct operating modes, one designed for while-drilling operations and the other for wiping trips. In one embodiment, the motion-tolerant T1 measurements are obtained when drilling motion is detected and the tool switches over to T2 once drilling ceases. In another embodiment, T1 and T2 measurements are acquired simultaneously over the same depth interval during a wiping trip.

In one embodiment, the process for obtaining T1 measurements during a drilling operation is described as follows. At the start of a measurement, one or more radio frequency pulses covering a relatively wide range of frequencies, or using one or more pulses which are frequency swept, are transmitted to saturate the nuclear magnetization in a cylindrical volume around the drilling tool. The range of frequencies can be, for example, 50–1000 kHz and is covered in a specific embodiment using a rapid succession of short radio frequency pulses similar to the first pulse in a standard CPMG pulse sequence, or using a single long pulse in a frequency sweep. Changing the range of frequencies used in this step varies the position and the width of the sensitive region in the formation. In a specific embodiment using the Miller tool, a frequency range between 50 and 100 kHz saturates the nuclear magnetization in a cylindrical volume around the tool, where the cylinder has a typical diameter of 14", a height of 24", and thickness of between about ½" to 1".

Figure 3:
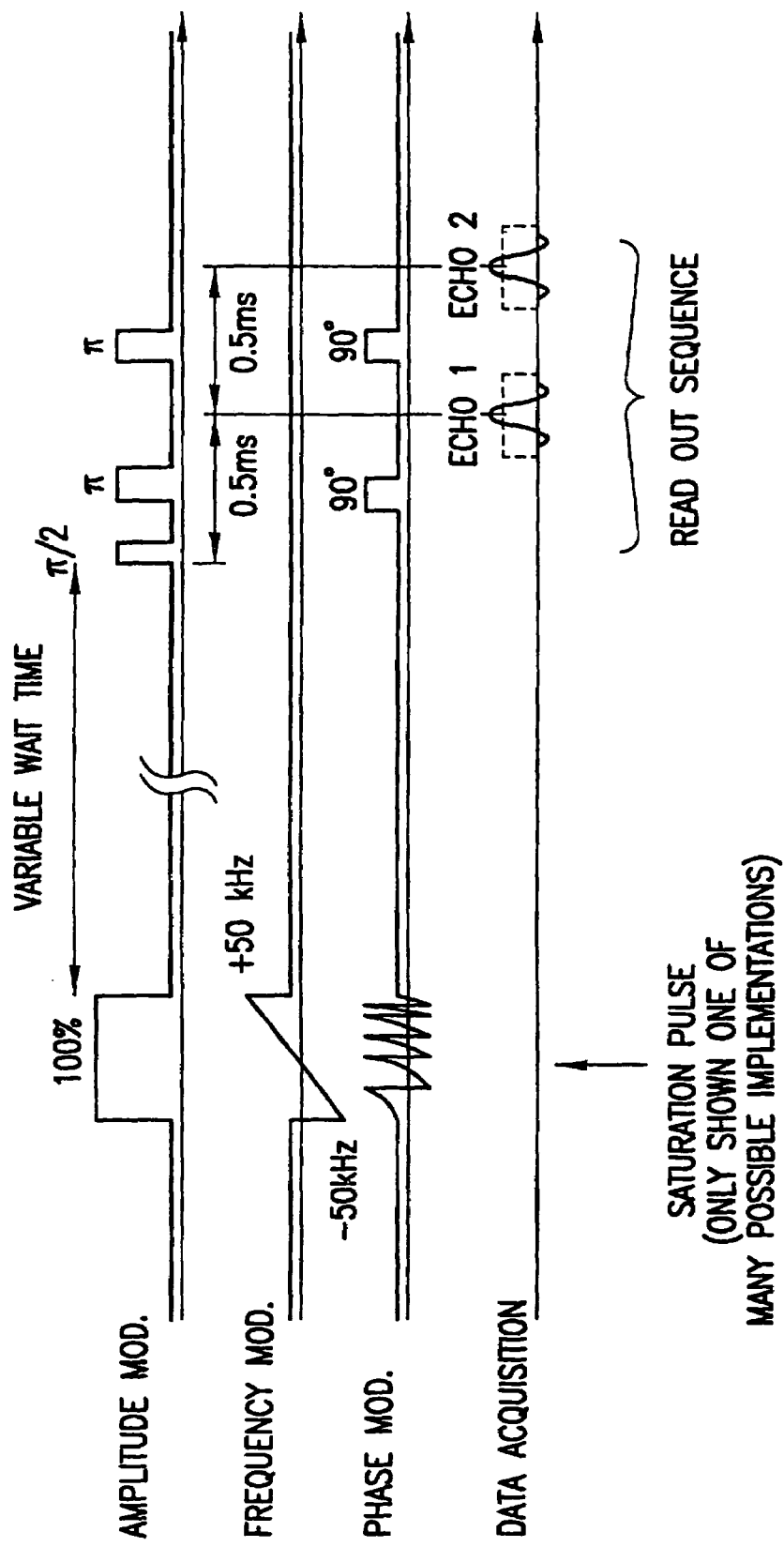
FIG. 3 illustrates a motion-insensitive pulse sequence used in a specific embodiment in accordance with the present invention.

Following the step of saturation, which typically takes about 1 ms, in accordance with the present invention a readout pulse is transmitted at a frequency near the center of the range of covered frequencies. In alternative embodiments one or more subsequent readout pulses can also be used. In accordance with the present invention, a readout pulse sequence is comprised of a 90° pulse followed by data acquisition, or of a 90° pulse followed by a 180° pulse, followed by data acquisition, where the steps of applying a 180° pulse and data acquisition can be repeated. The readout pulse sequence generally follows a predetermined wait time, as explained in more detail below. In a specific embodiment the readout pulse sequence is transmitted at a center frequency of about 500 kHz, and is followed by one or more refocusing pulses. An illustration of a pulse sequence used in a specific embodiment of the present invention is shown in FIG. 3.

Following the readout pulse(s), corresponding NMR echo signals are received, amplified and stored for further processing. In accordance with a preferred embodiment, the amplitude of the retained echo signal is interpreted as the level of nuclear magnetization present after the particular wait time. In the particular example considered above, the center frequency of the NMR echo signals corresponds to about 14" diameter of investigation.

The measurement process described above is repeated for a series of increasing wait times the values of which can, for example, be equally distributed on a logarithmic scale. In a specific embodiment, wait times are stepped through the values 1 ms, 3 ms, 10 ms, 30 ms, 100 ms, 300 ms, 1000 ms and 3000 ms, and the measurement results are stacked to produce several data points on a multi-component T1 relaxation curve. In one embodiment, only a few echoes are collected for each wait time to compute the T1 relaxation curve. Preferably, 5 echoes per wait time are retained.

T2 measurements can be obtained either separately or simultaneously with T1 measurements. In one embodiment, T2 measurements are obtained simultaneously with T1 measurements during one of the long wait times. This is done by acquiring a large number of echoes, preferably 500, during the long wait time and then using the large number of echoes to compute the T2 relaxation curve.

The T1 and T2 measurements obtained during the drilling operation are processed to derive petrophysical properties of local geological formations. As known in the art, these measurements can be used to compute distributions of T1 and T2 relaxation times. The resultant distributions of T1 and T2 relaxation times comprise data points of T1 and T2 relaxation curves. These relaxation curves are further processed to extract the dominant T1 and T2 relaxation modes, from which amounts of bound water, free water and hydrocarbons are estimated. The characteristic T1 or T2 times of the surface-wetting phase can also be used to estimate formation pore size distributions and formation permeability.

One embodiment of the present invention uses the T1 and T2 relaxation curves to determine different pore systems residing in carbonate formations and detect the existence of diffusive coupling among different pore systems. In one embodiment, a T1 relaxation curve is obtained and porosity analysis is performed by observing the T1 relaxation curve. The T1 relaxation curve may contain one or more peaks or modes. As known in the art, each peak or mode is associated with a pore system in the formation being analyzed. The size of each pore system can also be estimated based on the relaxation time associated with each peak. For carbonate formations, the T1 relaxation curve is bi-modal, indicating the existence of both a micro and macro pore systems.

The existence of diffusive coupling can be detected by comparing the T2 relaxation curve with the T1 curve and determining the inconsistency between the T1 and T2 curves. In one embodiment of the present invention, a T2 relaxation curve is plotted and compared with the T1 curve. As described above, the overall effect of diffusive coupling is a blurred T2 distribution. Therefore, diffusive coupling exists if the T1 curve is bi-modal and the T2 curve contains a single large broad peak that sweeps through mostly mid T2 ranges.

Figure 4:
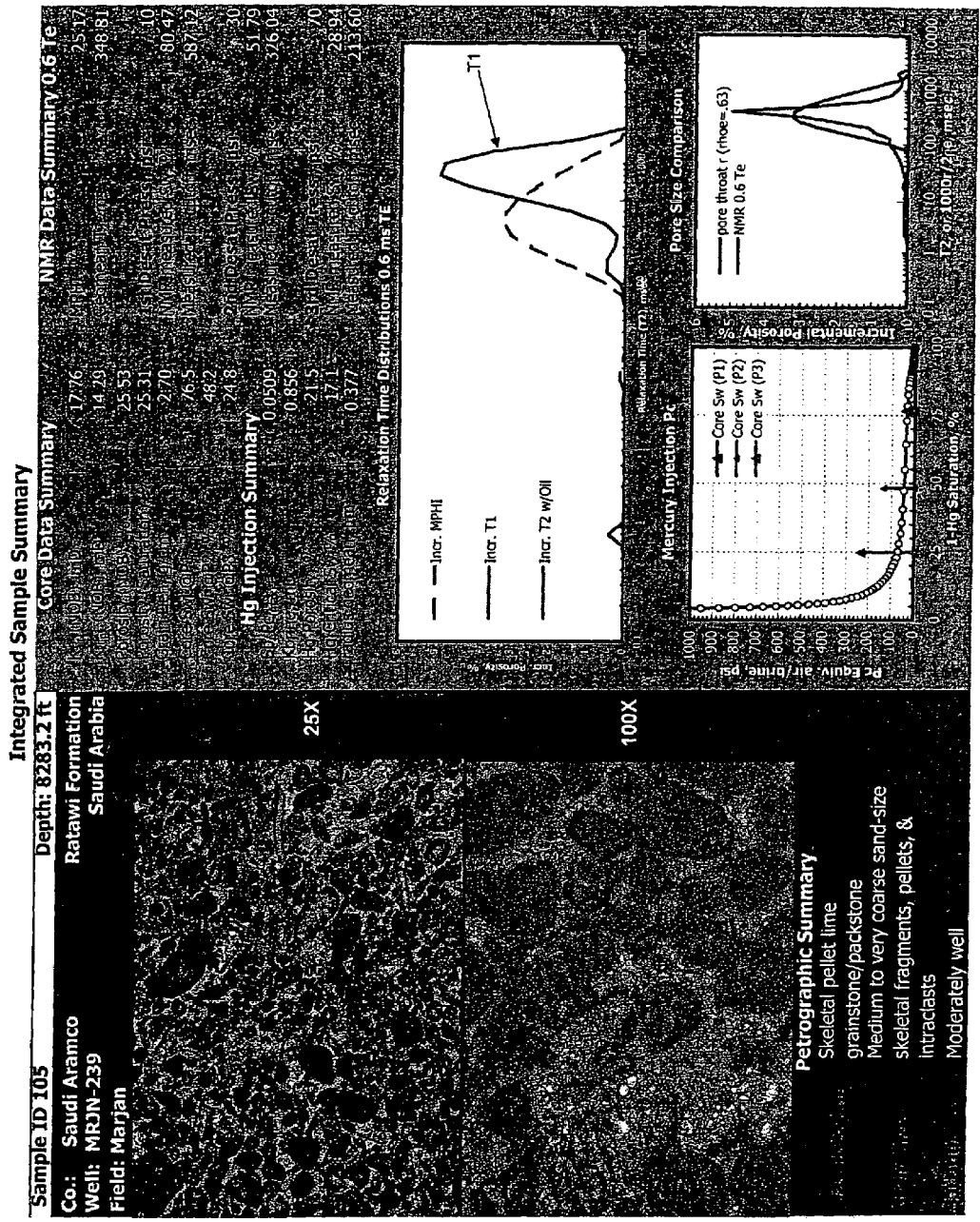
FIG. 4 shows a set of laboratory NMR measurements performed on a carbonate core plug from the Middle East.

FIG. 4 shows a set of laboratory NMR measurements performed on a carbonate core plug from the Middle East. From the figure, one can clearly see a bi-modal T1 relaxation curve and a broad T2 curve. The experiment proves the existence of diffusive coupling in the carbonate core plug.

The foregoing description of the preferred embodiments of the present invention has been presented for purposes of illustration and description. It is not intended to be exhaustive nor to limit the invention to the precise form disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

What is claimed is:

1. A method for analyzing the porosity of geologic formations containing carbonate-formations during a drilling operation, comprising the steps of:
   obtaining a first set of NMR measurements using T1 logging;
   obtaining a second set of NMR measurements using T2 logging; and
   processing said first and second sets of NMR measurements to derive a porosity interpretation of the carbonate-formation by (i) computing T1 and T2 distributions of the obtained first and second sets of NMR measurements, and (ii) comparing the computed T1 and T2 distributions to determine the existence of diffusivity coupling.

2. The method of claim 1, wherein the step of obtaining a first set of NMR measurements further comprises the step of:
   applying one or more times a chirped pulse sequence, comprising
      a radio frequency (RF) pulse covering a relatively wide range of frequencies to saturate nuclear magnetization in a volume within the geologic formation and
      a readout pulse sequence at a frequency within the range of covered frequencies, the readout pulse sequence following a predetermined wait time after the saturation pulse.

3. The method of claim 2, wherein the chirped sequence is repeated using different saturation recovery times.

4. The method of claim 3, wherein the chirped sequence is repeated using saturation recovery times including two or more of the following: 1 ms, 10 ms, 30 ms, 100 ms, 300 ms, 1000 ms, 3000 ms.

5. The method of claim 3, wherein the second set of NMR measurement using T2 logging is obtained during one or more of said different saturation recovery times.

6. The method of claim 2, wherein the range of frequencies is covered using a single pulse in a frequency sweep.

7. The method of claim 1, wherein the step of processing further comprises distinguishing different pore systems in the carbonate-formation based on the distribution of T1 relaxation times.

8. The method of claim 7, wherein the step of processing further comprises the steps of
identifying peaks of the T1 relaxation time distribution; and
deriving a porosity interpretation of the carbonate-formation based on the relaxation time distribution of each peak.

9. The method of claim 1, wherein the step of comparing further comprises the steps of:
determining whether the T1 and T2 relaxation time distributions are inconsistent; and
if inconsistent, determining whether the inconsistency is caused by diffusive coupling.

10. The method of claim 9, wherein the step of determining whether the T1 and T2 relaxation time distributions are inconsistent further comprises the steps of:
determining if the T1 relaxation time distribution contains two or more peaks; and
determining if the T2 relaxation time distribution contains a single broad peak.

11. The method of claim 1, wherein the first and second sets of NMR measurements are obtained simultaneously.

12. A system for analyzing the porosity of geologic formations containing carbonate-formations during a drilling operation, comprising:
means for obtaining a first set of NMR measurements using T1 logging;
means for obtaining a second set of NMR measurements using T2 logging; and
means for processing said first and second sets of NMR measurements to derive a porosity interpretation of the carbonate-formation by (i) computing T1 and T2 distributions of the obtained first and second sets of NMR measurements, and (ii) comparing the computed T1 and T2 distributions to determine the existence of diffusivity coupling.

13. The system of claim 12, wherein said means for obtaining a first set of NMR measurements using T1 logging further comprises: means for applying one or more times a chirped pulse sequence, comprising a radio frequency (RF) pulse covering a relatively wide range of frequencies to saturate nuclear magnetization in a volume within the geologic formation and a readout pulse sequence at a frequency within the range of covered frequencies, the readout pulse sequence following a predetermined wait time after the saturation pulse.

* * * * *